United States Patent
Oberhofer et al.

(10) Patent No.: US 11,663,275 B2
(45) Date of Patent: May 30, 2023

(54) METHOD FOR DYNAMIC DATA BLOCKING IN A DATABASE SYSTEM

(71) Applicant: International Business Machines Corporation, Armonk, NY (US)

(72) Inventors: Martin Oberhofer, Sindelfingen (DE); Geetha Sravanthi Pulipaty, Bangalore (IN); Ruolin Wu, Mississauga (CA); Mohammad Khatibi, Richmond Hill (CA); Neeraj Ramkrishna Singh, Bangalore (IN); Mark Wang, Vaughan (CA)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 16/841,255

(22) Filed: Apr. 6, 2020

(65) Prior Publication Data

US 2021/0042358 A1 Feb. 11, 2021

(30) Foreign Application Priority Data

Aug. 5, 2019 (EP) .................................... 19189996

(51) Int. Cl.
*G06F 16/906* (2019.01)
*G06F 16/22* (2019.01)

(52) U.S. Cl.
CPC ............ *G06F 16/906* (2019.01); *G06F 16/22* (2019.01)

(58) Field of Classification Search
CPC ................ G06F 16/906; G06F 16/22
(Continued)

(56) References Cited

U.S. PATENT DOCUMENTS 7,761,394 B2 7/2010 Acharya et al.
7,899,796 B1 3/2011 Borthwick et al.
(Continued)

FOREIGN PATENT DOCUMENTS

CN 102831222 B 12/2012
CN 105740404 A 7/2016
(Continued)

OTHER PUBLICATIONS

McNeill, N., Hakan Kardes, and Andrew Borthwick. "Dynamic record blocking: efficient linking of massive databases in mapreduce." Proceedings of the 10th international workshop on quality in databases (QDB). 2012. pp. 1-7. (Year: 2012).*
(Continued)

*Primary Examiner* — Muluemebet Gurmu
(74) *Attorney, Agent, or Firm* — Kelli D. Morin

(57) ABSTRACT

A method is disclosed for a database system that includes a set of data blocks comprising records having attributes. The set of data blocks are instances of at least one block type. The block type is defined by a subset of one or more attributes of the attributes. An instance of the block type comprises records having one distinct group of values of the subset of attributes. The method includes detecting that a subset of one or more data blocks of the block type, of the set of data blocks, reached a first maximum number of records. The method includes determining an additional attribute of the attributes to define a new block type by the combination of the additional attribute and the subset of attributes that define the block type. The method includes creating one or more data blocks which are instances of the new block type.

20 Claims, 7 Drawing Sheets

(58) Field of Classification Search
USPC .......................................................... 707/737
See application file for complete search history.

(56) References Cited

U.S. PATENT DOCUMENTS

| | | | |
|---|---|---|---|
| 8,452,755 | B1 | 5/2013 | Ye et al. |
| 8,799,282 | B2 | 8/2014 | Goldenberg et al. |
| 9,311,301 | B1 | 4/2016 | Balluru et al. |
| 9,836,488 | B2 | 12/2017 | Marrelli et al. |
| 10,467,201 | B1 | 11/2019 | Merritt et al. |
| 10,558,627 | B2 | 2/2020 | Cassidy et al. |
| 10,685,293 | B1 | 6/2020 | Heimann et al. |
| 10,719,301 | B1 | 7/2020 | Dasgupta et al. |
| 10,977,518 | B1 | 4/2021 | Sharma et al. |
| 2010/0010985 | A1 | 1/2010 | Wong et al. |
| 2010/0131506 | A1* | 5/2010 | Shintani ................ G06Q 30/02 707/E17.054 |
| 2013/0173560 | A1* | 7/2013 | McNeill ................ G06F 16/215 707/E17.005 |
| 2013/0204880 | A1 | 8/2013 | Lesiecki et al. |
| 2014/0258162 | A1* | 9/2014 | Maran ..................... G06F 16/24 707/758 |
| 2014/0280309 | A1* | 9/2014 | Anderson ............. G06F 16/285 707/769 |
| 2015/0269494 | A1 | 9/2015 | Kardes et al. |
| 2017/0039486 | A1 | 2/2017 | Simard et al. |
| 2017/0075918 | A1 | 3/2017 | Bates-Haus et al. |
| 2017/0076342 | A1 | 3/2017 | Golec et al. |
| 2017/0123676 | A1 | 5/2017 | Singhai et al. |
| 2017/0278043 | A1 | 9/2017 | Dow et al. |
| 2017/0286443 | A1 | 10/2017 | Ram |
| 2017/0337245 | A1* | 11/2017 | Beier ................... G06F 16/2433 |
| 2018/0121535 | A1 | 5/2018 | Oberhofer et al. |
| 2018/0227190 | A1 | 8/2018 | Healing et al. |
| 2020/0202171 | A1 | 6/2020 | Hughes et al. |

FOREIGN PATENT DOCUMENTS

| | | |
|---|---|---|
| CN | 105868773 A | 8/2016 |
| CN | 106777284 A | 5/2017 |

OTHER PUBLICATIONS

Evangelista, Luiz Osvaldo, et al. "Adaptive and flexible blocking for record linkage tasks." Journal of Information and Data Management 1.2 (2010): 167-167. (Year: 2010).*

Papadakis et al., "A Blocking Framework for Entity Resolution in Highly Heterogeneous Information Spaces," IEEE Transactions on Knowledge and Data Engineering, vol. 25, No. 12, Dec. 2013, pp. 2665-2682.

International Search Report and Written Opinion, International Application No. PCT/IB2020/057001, filed Jul. 24, 2020, 8 pgs.

Bremer et al., "Active Learning for Data Matching," U.S. Appl. No. 16/859,107, filed Apr. 27, 2020.

Khatibi, M., "Data Blocking in a Database System," U.S. Appl. No. 16/799,351, filed Feb. 24, 2020.

List of IBM Patents or Patent Applications Treated as Related, Apr. 22, 2020, 2 pgs.

Bremer et al., "Active Learning for Data Matching," Application No. eP19189991.3, filed Aug. 5, 2019.

Bremer et al., "Machine Learning Applied to the Clerical Task Management Problem in Master Data Management Systems," T. Grust et al. (Hrsg.): Datenbanksysteme für Business, Technologie und Web (BTW 2019), Lecture Notes in Informatics (LNI), Gesellschaft für Informatik, Bonn 2019 419, 13 pgs.

Khatibi, M., "Method for Data Blocking in a Database System", Application No. EP19189987.1, filed Aug. 5, 2019.

Kolb et al., "Block-based Load Balancing for Entity Resolution with MapReduce," dbs.uni-leipzig.de/file/pp0117-kolb.pdf, CIKM '11, Oct. 24-28, 2011, © 2011, ACM 978-1-4503-0717-8/11/10.

Oberhofer et al., "Method for Dynamic Data Blocking in a Database System," Application No. EP19189996.2, filed Aug. 5, 2019.

Papadakis et al., "Comparative Analysis of Approximate Blocking Techniques for Entity Resolution," http://www.mi.parisdescartes.fr/~themisp/publications/pvldb16-blockingtechniques.pdf, 2016, 12 pgs.

Papadakis et al., "Eliminating the Redundancy in Blocking-based Entity Resolution Methods," http://disi.unitn.it/~themis/publications/jcdl11-ElimRedund.pdf, JCDL '11, Jun. 134-17, 2011, © 2011, ACM 978-1-4503-0744-04/11/06.

Papadakis et al., "Meta-Blocking: Taking Entity Resolution to the Next Level," http://www.mi.parisdescartes.fr/~themisp/publications/tkde13-metablocking.pdf, Mar. 27, 2013, 17 pgs.

Shao et al., Active Blocking Scheme Learning for Entity Resolution,: users.cecs.anu.edu.au/~u5170295/papers/pakdd-shao-2018.pdf, Research School of Computer Science, Australian National University, 12 pgs., accessed Oct. 11, 2019.

Simonini et al., "Blast: a Loosely Schema-aware Meta-blocking Approach for Entity Resolution," Proceedings of the VLDB Endowment, vol. 9, No. 12, ©2016 VLDB Endowment, pp. 1173-1184.

Simonini et al., "Scaling entity resolution: A loosely schema-aware approach," Information Systems, vol. 83, pp. 145-165, ISSN 0306-4379, 2019.

* cited by examiner

METHOD FOR DYNAMIC DATA BLOCKING IN A DATABASE SYSTEM

BACKGROUND

The present invention relates to the field of digital computer systems, and more specifically, to a method for a database system.

Entity Resolution (ER) is the process for identifying the same real-world data across different sources of information, by cross-comparing data from all sources of information to conclude entity profiles. However, this process may be intensive and time consuming.

SUMMARY

Various embodiments provide a method for a database system, computer system, and computer program product as described by the subject matter of the independent claims. Advantageous embodiments are described in the dependent claims. Embodiments of the present invention can be freely combined with each other if they are not mutually exclusive.

In one aspect, the invention relates to a method for a database system, the database system comprising a set of data blocks comprising records having a set of attributes, where the set of data blocks are instances of at least one block type, where the block type is defined by a subset of one or more attributes of the set of attributes such that an instance of the block type comprises records having one distinct group of values of the subset of attributes. The method comprises: detecting that a subset of one or more data blocks of the block type, of the set of data blocks, reached a first maximum number of records; determining an additional attribute of the set of attributes in order to define a new block type by the combination of the additional attribute and the subset of attributes that define the block type; creating one or more data blocks which are instances of the new block type; and storing a received new record having values of the subset of attributes and of the additional attribute in the corresponding instance of the new block type.

In another aspect, the invention relates to a computer system comprising a set of data blocks comprising records having a set of attributes, where the set of data blocks are instances of at least one block type, where the block type is defined by a subset of one or more attributes of the set of attributes such that an instance of the block type comprises records having one distinct group of values of the subset of attributes. The computer system is configured to: detect that a subset of one or more data blocks of the block type, of the set of data blocks, reached a first maximum number of records; determine an additional attribute of the set of attributes in order to define a new block type by the combination of the additional attribute and the subset of attributes that define the block type; create one or more data blocks which are instances of the new block type; and store a received new record having values of the subset of attributes and the additional attribute in the corresponding instance of the new block type.

In another aspect, the invention relates to a computer program product comprising a computer-readable storage medium having computer-readable program code embodied therewith, the computer-readable program code configured to implement all of steps of the method according to preceding embodiments.

The present subject matter may increase the storage efficiency of data by blocking them based on their content. This may, for example, enable to store the data blocks in a distributed database. The present subject matter may enable to obtain consistent storage of data e.g. if the present method is executed on different database systems, the blocking may be similar in the database systems. The data blocking may be a technique to cluster records with similarities into data blocks. The data blocking may enable to do searching and comparing efficiently among the records in the same blocks. The present subject matter may enable to adjust a data blocking strategy at runtime without deep subject matter experts being required.

Another advantage may be that the present subject matter may easily scale with increasing data. For example, the blocking may result in blocks of records that may be stored separately e.g. instead of storing all the records in one storage or one disk, by blocking them in accordance with the present subject matter some blocks may be stored separately from other blocks. This may enable a flexible storage of the data by distributing them over a distributed storage system.

Another advantage may be that the present subject matter may enable an efficient access to data stored in a database system. For example, the blocking in accordance with the present subject matter may make processing more efficient as the blocks are defined based on content of their data. In addition, an entire block as herein defined and created can be accessed at once instead of reading or writing records individually.

Another advantage may be that the handling of the large-sized blocks is addressed by the present subject matter by controlling the maximum size of each block. Having small sized blocks for each block type may facilitate and increase the efficiency of the processing of the records for the following reasons. For example, when a block becomes a common block for a large number of records (like a blocking on a most-used first name and last name in a dataset, e.g. 5000 records for 'John Smith' variation in a dataset) it causes entity resolution to go after excessive number of comparisons as a result of large number of candidates in the same block. This essentially makes such impacted frequent blocks unusable/inefficient, while such block type (first name+last name) may still be useful and required for non-frequent blocks.

BRIEF DESCRIPTION OF THE DRAWINGS

In the following embodiments of the invention are explained in greater detail, by way of example only, with reference to the drawings in which.

DETAILED DESCRIPTION

Figure 1:
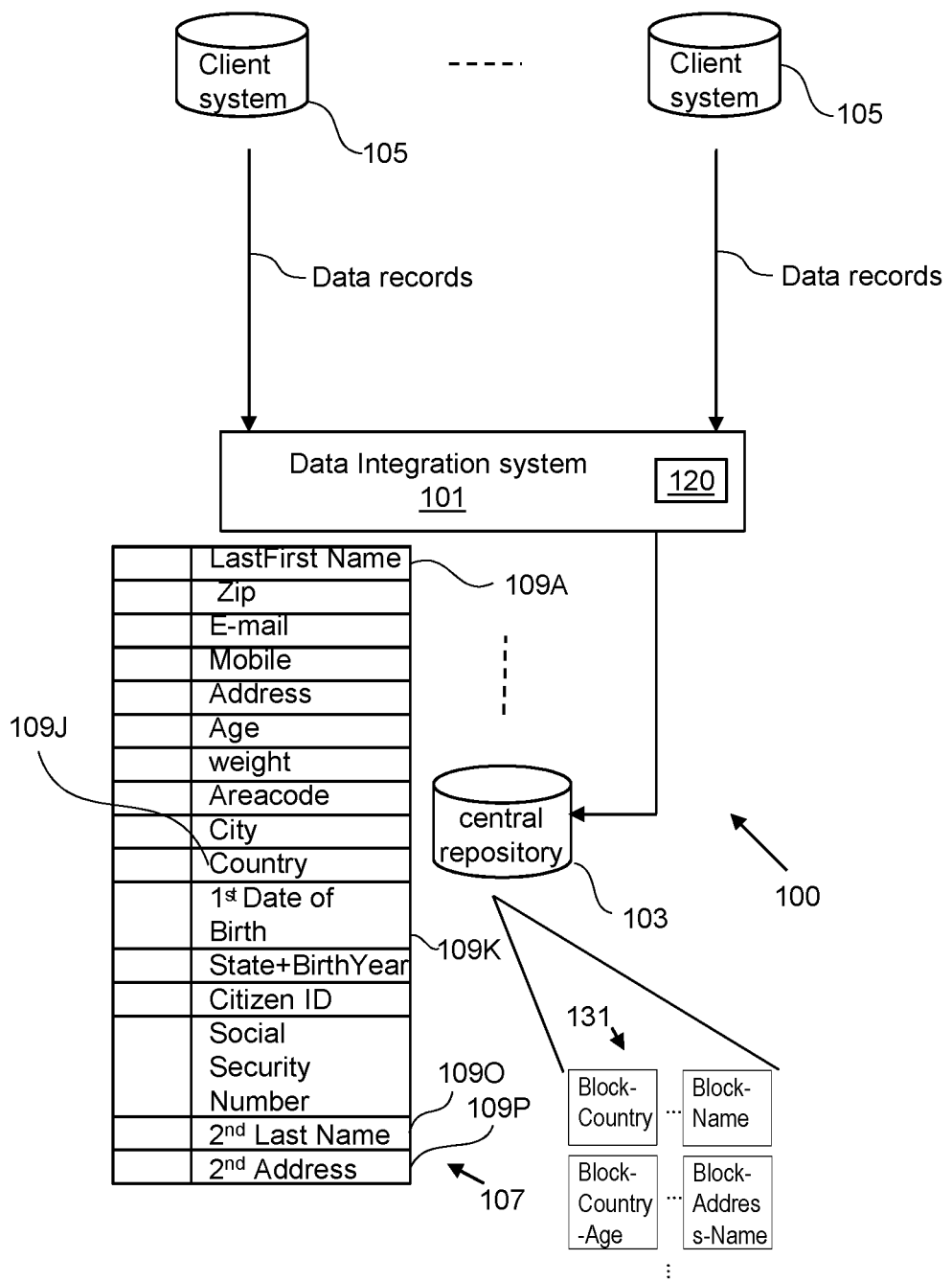
FIG. 1 depicts a block diagram representation of an exemplary computer system in accordance with the present subject matter.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A data record or record is a collection of related data items such as a name, date of birth and class of a particular user. A record represents an entity, wherein an entity refers to a user, object, or concept about which information is stored in the record. The terms "data record" and "record" are interchangeably used. The data records may be stored in a graph database as entities with relationships, where each record may be assigned to a node or vertex of the graph with properties being attribute values such as name, date of birth etc. The data records may, in another example, be records of a relational database. A record metadata may be provided. The record metadata may be a structural metadata containing the metadata for all record's attributes, including a name of attributes, attribute data type, attribute granularity, etc. For example, a person data record has the structural metadata for first name, last name, and date of birth attributes.

A data block or instance is one or more units of recording on disk. A block size may be the physical block size written on the disk for records. A data block and instance may interchangeably be used. A block type of the data block may be defined by one or more attributes. For example, a name attribute may define a block type name. The block type may for example be a structural metadata for blocking, defining how block values can be constructed for a given record. For example, a block type for a person record type may be defined as LastName or LastName+FirstName or YearOfBirth+City, etc. Each block type may have instances or block values which refer to the distinct values of the attribute that defines the block type. If more than one attribute defines the block type, an instance may refer to a distinct group of values of the more than one attribute. For example, the block type name may have as instances Smith and Mike. An instance of the block type may be configured to comprise records that have the distinct value of the attribute that defines the block type. For example, instance Smith may comprise records that have the value of the attribute name which is equal to Smith. Each unique block value or instance may be associated with instance metadata indicative or descriptive of the instance. The instance metadata of an instance may further comprise references to the corresponding records of the instance. For example, Smith and Smith+John and 1980+Toronto may represent the instances for a John Smith record who is born in 1980 Jan. 2 and lives in a home address in Toronto.

The level of a data block may be represented by a value indicative of the level. For example, the first level may be represented by value 1, the second level may be represented by value 2, and the $n^{th}$ level may be represented by value n. The level of a data block may be the value that represents that level e.g. the level of the first level data block is 1. For example, the block type may be defined by one attribute ATT1. The set of data blocks which are instances of the block type may be L1 (level 1) blocks, because they are the first blocks being processed by the present method. And, if the new block type is the combination of two or more attributes e.g. ATT1+ATT2, this may indicate that the blocks that have been created for this new block type are the level L2 blocks of the level L1 blocks, because the new block type is the first type created from the block type (e.g. if by repeating the method for the new block type an another new block type is defined, the blocks of this other new block type may be level 3 L3 blocks). The L1 and L2 blocks may define a hierarchy of blocks forming a group of a defined category, where the category is defined by an attribute which defines the block type e.g., the block type and the category may be defined by a same attribute.

According to one embodiment, the method further comprises storing the records of the subset of data blocks in the corresponding instances of the new block type and removing the subset of data blocks. In one example, all records of all instances of the block type may be stored in the corresponding instances of the new block type. This may result in a rearrangement of the data records in the new block structure. This may enable an optimal storage of records. The blocks may be smaller and thus the access to the blocks may be faster as they may easily be loaded into memories. This embodiment may further have the advantage of saving processing resources that would otherwise be used for maintaining the subset of data blocks if not deleted.

This embodiment may enable to replace the block type with its new definition, namely the new block type. This may be done by removing all existing instances of the block type, updating the block type as described herein to define the new block type, and re-blocking all impacted records according to the updated block type (new block type). The impacted records may be records stored in instances of the block type to be replaced.

In another example, instead of removing the existing instances they may be maintained, and the new block type may be used as the next level of the blocks having the block type. In this way, no re-blocking of the current records may be required. And, once a given instance of the block type reaches a given maximum, then more record references are not added to the current block type, instead one move to and relate the records to the new block type at next level. This would allow leveraging the first level block type for the less-frequent block values, while it dynamically switches to the subsequent levels for the high-frequent block values.

According to one embodiment, the at least one block type comprises multiple block types, each block type of the block types being defined by a respective subset of one or more attributes of the set of attributes, the method further comprising repeating the method for each distinct block type of the multiple block types. This may further increase the storage optimization by processing all block types that exist in the database system.

According to one embodiment, the repeating of the method is performed in parallel for the distinct block types. This may speed up the process of dynamic blocking in accordance with the present subject matter.

According to one embodiment, the detecting comprises detecting a data block of the set of data blocks that reached a second maximum number of records, and searching for data blocks that reached the first maximum number of records, resulting in the subset of one or more data blocks of the block type. For example, if the current size of the data block is equal to or larger than a trigger threshold (which is the second maximum number) the data block may be detected or identified. However, to re-evaluate existing large blocks, a lower re-evaluation threshold (the first maximum number) may be applied to expand the scope of dynamic data blocking and to cover the other blocks in the same block type that will be likely becoming large soon. This embodiment may enable a systematic and efficient way for identifying data blocks that needs to be processed. The method may be efficient in that a single block is first detected and only then the rest of blocks is determined instead of searching all those blocks at once.

The data block that reached or exceeded the second maximum number of records may be referred to a highly referenced block. For example, if year of birth for a majority of person records in a system are identical, then blocking on year of birth could result in creation of a highly referenced block or large block. Since this embodiment may avoid large blocks it may enable to support efficient search and comparison operations using the data blocks in accordance with the present subset matter.

According to one embodiment, the second maximum number is higher than the first maximum number. This embodiment may be advantageous as it may anticipate and react before other data blocks of the block type reach the highest size (the second maximum number).

According to one embodiment, determining the additional attribute comprises: reading all records of the subset of the data blocks; determining a qualified subset of attributes of the set of attributes that are different from the subset of attributes; for each candidate attribute of the qualified subset determining all instances of a candidate block type that can comprise the read records, the candidate block type being defined by a combination of the subset of attributes and the candidate attribute; determining the duplicate rate of records in the determined instances; selecting the candidate attribute associated with the lowest rate of the duplicate rates; providing the additional attribute as the selected attribute. The duplicate rate of an instance may be the number of records in the instance. This embodiment may enable a systematic method that can dynamically be executed for an optimal determination of the new block type. This embodiment may be advantageous as it takes into accounts records of blocks that will be likely becoming large soon.

According to one embodiment, the providing is performed if the lowest rate is smaller than a predefined threshold, the method further comprising in response to determining that the lowest rate is higher than the predefined threshold, repeating the determining step and selecting step using instead of the candidate attribute a combination of the candidate attribute and one more further candidate attribute in each iteration, wherein the additional attribute is the selected combination of two or more candidate attributes. This embodiment may enable a systematic method that can dynamically be executed for an optimal determination of the new block type.

According to one embodiment, the qualified subset of attributes is a user defined subset. For example, a user may be prompted to provide the qualified subset of attributes. In response to the prompting the qualified subset may be received. In another example, any combination of one or more attributes, in or out of the set of attributes, to be "clubbed" together with the current block type (when there is a subset of attributes in the set of attributes) may result in effectively lowering the block size to an acceptable size. This may enable an optimal control of the dynamic blocking in accordance with the present subject matter.

According to one embodiment, the method is only performed if the data block that reached the second maximum number of records is not part of a block stop list. That is, if it is determined that the data block that reached the second maximum number of records is part of a block stop list, the method stops e.g. no new block type may be determined.

According to one embodiment, wherein the repeating is performed while the number of attributes in the combination of candidate attributes is smaller than a predefined maximum number, wherein the providing is performed in case said number of attributes is smaller than the maximum number, wherein in case said number of attributes becomes larger than the maximum number, adding the data block that reached the second maximum number of records to the block stop list. This embodiment may enable to improve the control aspect of the dynamic blocking. By using the block stop list, processing resources may be saved that would otherwise be required for unnecessarily reprocessing those block types of the list.

According to one embodiment, the additional attribute is a primitive type with a predefined maximum length, excludes a Binary Large OBject (BLOB), and has a duplication rate that is smaller than a predefined maximum rate. The primitive type may be a string, integer, date, float, or the like.

According to one embodiment, the detecting further comprises initiating a dynamic data blocking process by registering the dynamic data blocking process for the block type, wherein the determining and creating steps are steps of the dynamic data blocking process, wherein the method further comprises after the creating step unregistering the dynamic data blocking process for the block type. The initiating of the dynamic data blocking process may be performed in response to determining that the dynamic data blocking process is not initiated for the block type.

In one example, the method further comprises if the data block that reached the second maximum number of records is not part of a block stop list, and if the dynamic data blocking process is already initiated for the block type ending the method (the determining and creating steps may not be performed)

A flag of the dynamic data blocking process may define the state of the computer system, when it tries to re-evaluate the existing large block values of a block type. This may yield in the needed adjustment to the existing hierarchical block types. The flag may enable that the dynamic data blocking process is only run once at any point in time, in regard to an impacted block type. Running the process only once on a given impacted block type may be advantageous as the process may be a relatively long process. An impacted block type is a block type for which it was determined that one of its instances has reached the first maximum first maximum number of records or the second maximum number of records.

According to one embodiment, the storing of the received new record and further received new records having values of the subset of attributes and the additional attribute in the corresponding instances of the new block type resulting in a group of blocks that are associated with the subset of attributes, the group of blocks comprising the blocks of the block type as first level blocks and the blocks of the new block type as a second level of blocks. The method further comprises receiving a record having non-empty values of the subset of attributes; determining from the group of blocks all applicable full blocks that have the first maximum number of records and an additional applicable block that has less than the first maximum number of records and that has a level that is equal or subsequent to the highest level of the determined full blocks; comparing the received record with each record of the determined blocks. For example, if a block value or instance at any level (let's assume Level 1) is overpopulated, then the record may not be assigned to the block and instead the block at the next level (or at a same level) may be examined. This may be done till one get to a new block or a less-populated block. Then the record may be assigned to that block and other blocks at other levels may be ignored. This embodiment may enable an effective ER for a large volume as it may minimize the number of cross comparisons. The data blocking groups similar data into same blocks and may thus help to cut down the required comparisons to conclude entity profiles. The ER may be effective because the comparisons involve small sized data blocks.

FIG. 1 depicts an exemplary computer system 100. The computer system 100 may, for example, be configured to perform master data management and/or data warehousing. The computer system 100 comprises a data integration system 101 and one or more client systems or data sources 105. The client system 105 may comprise a computer system (e.g. as described with reference to FIG. 6). The data integration system 101 may control access (read and write accesses etc.) to a central repository 103. The storage system may comprise the central repository 103.

Data integration system 101 may process records received from client systems 105 and store the data records into central repository 103 in accordance with the present subject matter. The client systems 105 may communicate with the data integration system 101 via a network connection which comprises, for example, a wireless local area network (WLAN) connection, WAN (Wide Area Network) connection LAN (Local Area Network) connection or a combination thereof.

The data records stored in the central repository 103 may have a predefined data structure 107 such as a data table with multiple columns and rows. The predefined data structure may comprise multiple attributes 109A-P (e.g. each attribute representing a column of the data table 107). In another example, the data records may be stored in a graph database as entities with relationships. The predefined data structure may comprise a graph structure where each record may be assigned to a node of the graph. Although the present example is described in terms of few attributes, more or less attributes may be used. The multiple attributes 109A-P may, for example, be dynamically updated or determined while receiving data records e.g. if a received data record has a new attribute that is not part of the multiple attributes 109A-P, that new attribute may be added to the multiple attributes 109A-P. In another example, the multiple attributes 109A-P may be determined based on historical data indicating all attributes that are used by client systems 105.

For example, the client systems 105 may be configured to provide or create data records which may or may not have the same data structure 107. The attributes of each record received from the client systems 105 may comprise all the attributes 109A-P or only part of the attributes 109A-P. Comprising only part of the attributes means that the received record has non-empty values for that part of attributes and has empty values for the other part of the attributes of the multiple attributes 109A-P. For example, a client system 105 may be configured to provide records in XML or JSON format or other formats that enable to associate attributes and corresponding attribute values, wherein at least part of the attributes 109A-P are associated in the XML, with respective values.

Each client system 105 may be configured to send the created data records to the data integration system 101 in order to be stored on the central repository 103 after being processed in accordance with an example method of the present disclosure. Before being processed, the received record may be transformed e.g. by the data integration system 101, into a format of the data structure 107.

In one example, data integration system 101 may import data records from a client system 105 using one or more Extract-Transform-Load (ETL) batch processes or via HyperText Transport Protocol ("HTTP") communication or via other types of data exchange. The data integration system 101 and/or client systems 105 may be associated with, for example, Personal Computers (PC), servers, and/or mobile devices.

Each data record received from client systems 105 by the data integration system 101 may or may not have all values of the multiple attributes 109A-P e.g. a data record may have values of a subset of attributes of the set of attributes and may have empty values for the remaining attributes. In other words, the records provided by the client systems 105 may have different completeness. The completeness is the ratio of number of attributes of a data record comprising data values to a total number of attributes in the multiple attributes 109A-P.

The data integration system 101 may be configured to process the received records using one or more algorithms such as an algorithm 120 implementing at least part of the present method. For example, the data integration system 101 may process the data records received from the client systems 105 using the algorithm 120 in order to perform at least part of the present subject matter e.g. as described with reference to FIG. 2.

For example, the received records may be blocked in accordance with a predefined blocking method so that central repository 103 comprises a set of data blocks 131. The set of data blocks 131 are instances of at least one block type. The block type is defined by a subset of one or more attributes of the set of attributes 109A-P such that an instance of the block type comprises records having one distinct group of values of the subset of attributes.

For example, a block type may be defined by the attribute Country. In this case, instances of this block type may be Germany, USA, France etc. instances. Each instance e.g. Germany instance, comprises records that all have the attribute value e.g. Germany of the attribute that defines the instance.

In another example, a block type may be defined by a combination of multiple attributes e.g. two attributes such as Country and Age. This defines the block type Country-Age. In this case, instances of this block type may be Germany-30, Germany-70, Germany-65, USA-72, USA-23, France-45 etc. instances. An instance such as Germany-30 comprises records that all have the attribute value Germany and age 30 i.e. the instance comprises records of Germans which are 30 years old. Each of Germany-30, Germany-70, USA-30 etc. may be referred to as a distinct group of values of the block type Country-Age.

In accordance with the present subject matter, the system 100 may be configured to be in a dynamic data blocking process state for each block type. That is, if the system 100 is in the dynamic data blocking process state for a particular block type, at least part of the present method may be performed for that particular block type.

Figure 2:
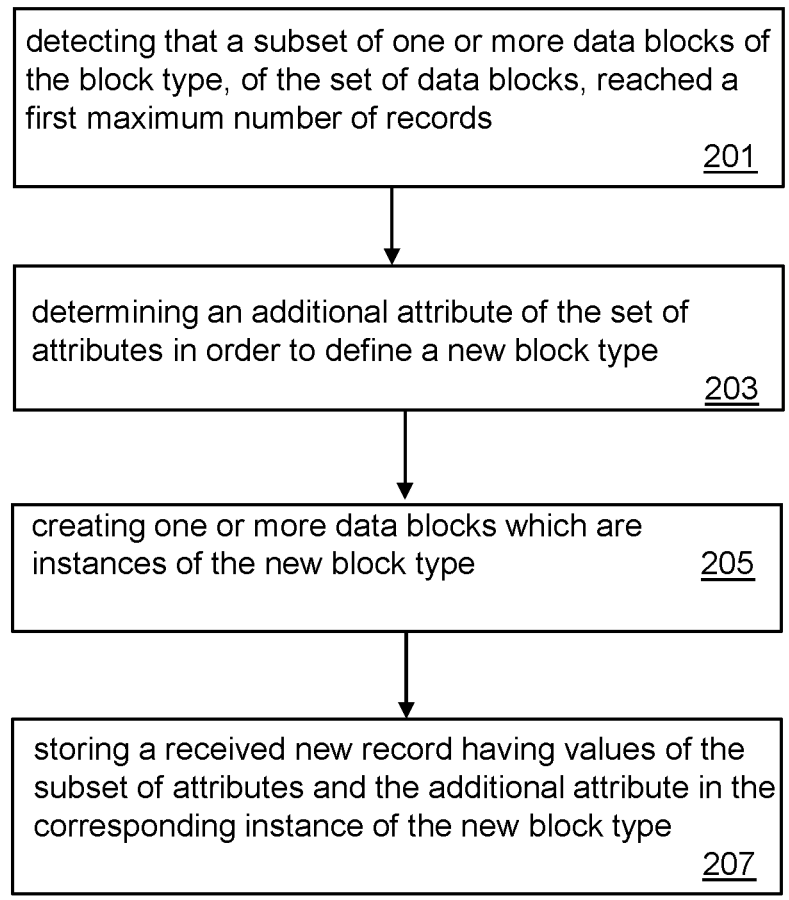
FIG. 2 is a flowchart of a method for managing data blocks of a database system in accordance with an example of the present subject matter.

FIG. 2 is a flowchart of a method for managing data blocks of a database system such as data blocks 131 of system 100. The method of FIG. 2 may enable to monitor the content of the data blocks 131 in order to dynamically adjust them depending on the amount of records being received. For example, the method of FIG. 2 may be performed for a particular block type as follows.

For example, in step 201 a subset of one or more data blocks or instances of the particular block type of the set of data blocks 131 that reached a first maximum number of records may be detected or identified. This step may be performed as part of monitoring the content of the data blocks 131. Assuming for exemplification purpose that the particular block type is defined by the attribute Name.

In one example, the detecting may be performed separately for each block of the subset of blocks. That is, the content of each block of the block type may be monitored independently from the others and if it reaches the first maximum number of records it may be detected and included in as part of the detected subset.

In another example, the detecting may be performed using two thresholds, namely a trigger threshold and a lower re-evaluation threshold. The re-evaluation threshold may be the first maximum number. In this example, the detecting of step 201 may be performed as follows. When a particular instance (e.g. Smith+John) of block type Name is being examined by the system, the size of the instance may be compared against the trigger threshold (e.g. 1000). It may be determined if the number of records of the instance is higher than 1000 records. If the current size of the instance is equal to or larger than the trigger threshold the instance may be part of the subset detected in step 201. This results in detecting a first instance of the block type Name that has reached the trigger threshold. This may trigger the re-evaluation of the existing large blocks, using the re-evaluation threshold (e.g. 800). The re-evaluation threshold is applied to expand the scope of dynamic data blocking and to cover the other blocks in the same block type Name that will be likely becoming large soon. For that all instances of the block type Name that have the number of records higher than the re-evaluation threshold may be detected or identified. Those all instances in addition to the first instance may be part of the detected subset of step 201.

In one example, if the system is not already in a dynamic data blocking process state for the block type Name, then the dynamic data blocking process for such block type may be initiated in step 201. The dynamic data blocking process may enable to perform at least one of steps 203 and 205.

In step 203, an additional attribute of the set of attributes may be determined in order to define a new block type by the combination of the additional attribute and the subset of one or more attributes that define the block type. This determination of the additional attribute may be performed using the record metadata and the instance metadata.

Following the example above, if the block type is defined by Name attribute, an additional attribute such as Country or Address etc. of the set of attributes may be determined in step 203. If for example the additional attribute is Address, then the new block type may be defined by the combination of Name and Address.

In one example, the additional attribute may be any attribute of the set of attributes 109A-P e.g. the additional attribute may randomly be selected from the set of attributes 109A-P. Another example of determining the additional attribute of step 203 is described with reference to FIG. 3A.

In step 205, one or more data blocks which are instances of the new block type may be created.

For that, distinct groups of values of the new block type may be determined. This may for example be performed using metadata descriptive of the content of the data blocks 131. The metadata indicates which distinct values of each attribute 109A-P are being stored in the data blocks 131. The distinct group of values of the new block type may be derived or determined from the distinct values of each attribute 109A-P. Following the above example, the distinct values of Address and Name that are provided in the metadata may be Smith-John, Mike-Kile and Springfield, Berlin. The distinct group of values of the new block type Address-Name may be the following Smith-John-Springfield, Smith-John-Berlin, Mike-Kile-Springfield, Mike-Kile-Berlin. In this case, four data blocks or instances which are associated with Smith-John-Springfield, Smith-John-Berlin, Mike-Kile-Springfield, Mike-Kile-Berlin may be created.

The new blocks may help to overcome the block size related issue detected in step 201. They define a next level blocking. For example, a received one or more new records having values of the subset of attributes and the additional attribute may be stored in step 207 in the corresponding instance of the new block type. Following the above example, a received record that has name Smith-John and address Springfield may be stored in the instance that has been created for the distinct group of values Smith-John-Springfield.

The received one or more new records may be part of a dataset that may need to be stored in the database system. A dataset is a collection of one or more data records. For example, the dataset may be provided in the form of a collection of related records contained in a file e.g. the dataset may be a file containing records of all students in class. The dataset may, for example, be a table of a database or a file of a Hadoop file system, etc. In another example, the dataset may comprise a document such as a HTML page or other document types. The document may, for example, comprise data of a patient. The dataset may for example be received from one or more sources of data before being processed by the present method. The processed records may, for example, be stored in blocks in a central repository. The central repository may be a data store, storage, or database that stores data received from multiple client systems. Additionally, or alternatively, the dataset may comprise existing records of the database system that are identified or selected in order to be processed by the present method. For example, a user selection of records of the dataset may be received. The records of the dataset may for example be pre-processed before being processed by the present method. The pre-processing may for example comprise transforming the format of the attribute values of the records of the dataset. For example, attribute values may be uppercased, their noise characters (such as - . / characters) may be removed. Anonymous attribute values (like a city=nowhere or first name=Test) may be removed and word mapping of attribute values may be performed to map a given attribute value to a corresponding predefined value (e.g. St. becomes Street after mapping St. to Street).

In one example, steps 201-207 may be repeated for the new block type instead of the block type. This may enable a continuous monitoring of data blocks in accordance with the present subject matter.

Figure 3A:
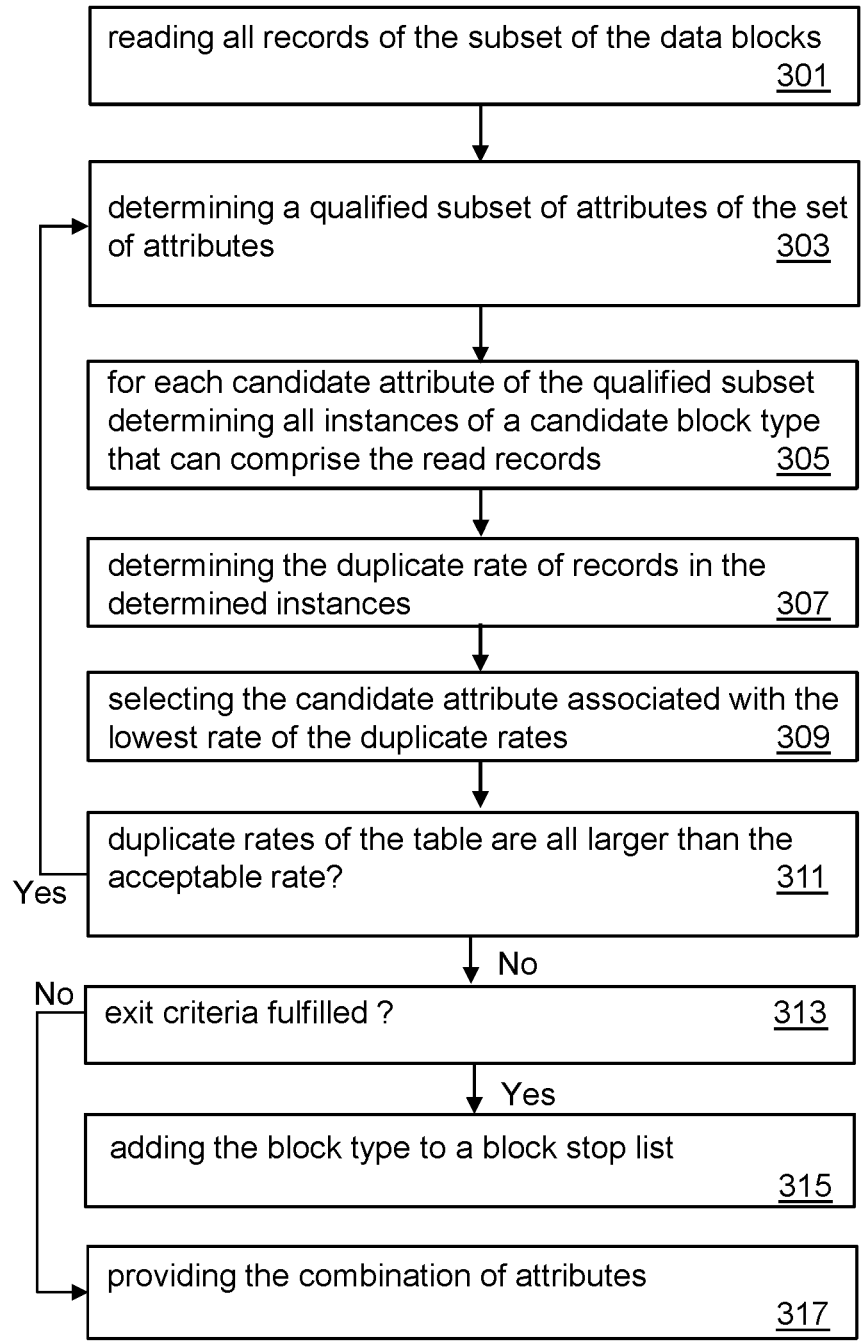
FIG. 3A is a flowchart of a method for determining a combination of attributes of a set of attributes in accordance with an example of the present subject matter.

FIG. 3A is a flowchart of a method for determining a combination of attributes of a set of attributes e.g. 109A-P in accordance with an example of the present subject matter in order to determine a new block type e.g. as in step 203.

For example, a subset of data blocks may be provided. The subset of data blocks may be instances of a particular block type e.g. the block type for which the dynamic data blocking process is initiated. The block type may be defined by a subset of one or more attributes (named SUB1) of the set of attributes 109A-P. The subset of data blocks may for example be the subset of data blocks detected or identified in step 201 of FIG. 2. This subset of data blocks or instances 322.1-N are referred to as Block value 1 to N in table 319 of FIG. 3B. The subset of data blocks may have been determined as described above using two thresholds, namely a trigger threshold and a lower re-evaluation threshold. The re-evaluation threshold may be the first maximum number and the trigger threshold is the second maximum number. The data block that has reached the trigger threshold may first be identified and the remaining blocks of the subset may be the blocks that reached the re-evaluation threshold. The present method may end if the data block that has reached the trigger threshold is part of a block stop list.

The combination of attributes may be determined so that data records of instances of the particular block type may optimally be distributed or stored over new instances of a new bock type that is defined by said combination of attributes. The determination of the combination of attributes may be performed dynamically or on the fly before creating the new instances.

The determination of the combination of attributes may be performed by sequentially determining each attribute of the combination of attributes. For example, the combination of attributes may first be initialized by the subset of one or more attributes that define the particular block type for which the dynamic data blocking is initiated. In addition to the subset of one or more attributes, the present method may enable to determine an additional attribute.

In step 301, all records of the subset of the data blocks may be read. This may enable to have access to the number of records and attribute values of all records of the subset of data blocks. This may save processing resources as only records of sub blocks are read and not all blocks of the particular block type. In another example, all records of the data blocks that are instances of the particular block type may be read in step 301. This may enable an accurate determination of the combination of attributes, in particular it may be advantageous if all records of the particular block type are to be reorganized or restored in the new instances.

A qualified subset of attributes SUB2 of the set of attributes 109A-P may be determined in step 303. The qualified subset of attributes SUB2 are all different from the subset of attributes SUB1.

In one example, the qualified subset of attributes SUB2 may randomly be determined from the set of attributes 109A-P. In another example, if a business domain expert has already determined a user defined subset of attributes that are suitable for blocking, then the qualified subset SUB2 may comprise the user defined subset of attributes. In another example, the qualified subset of attributes may be selected from the set of attributes 109A-P by excluding attributes that impact performance such as large string fields, BLOB, high frequency etc. Excluding those attributes from the set of attributes 109A-P may result in the qualified subset SUB2.

Figure 3B:
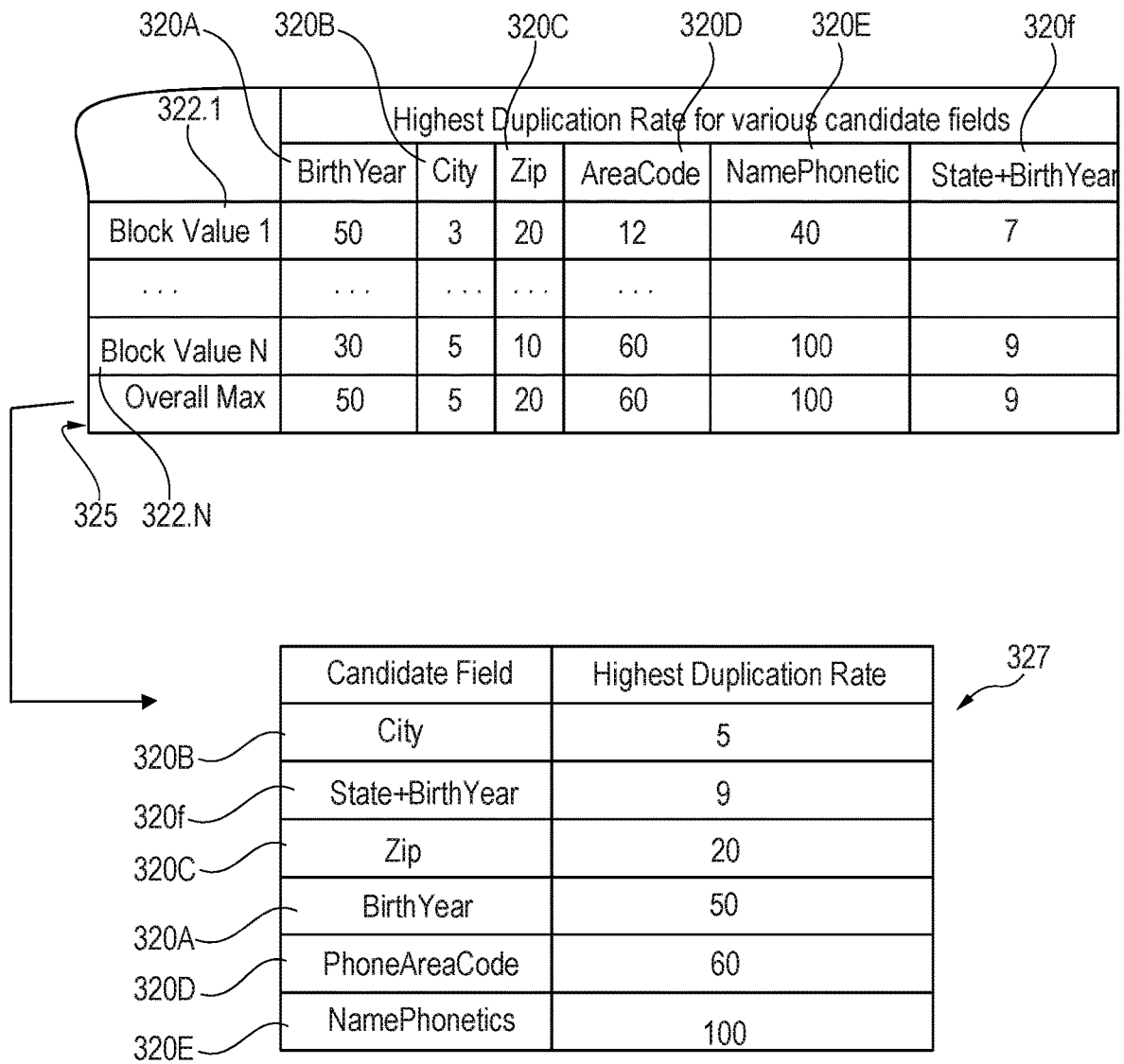
FIG. 3B depicts tables indicating a subset of attributes and corresponding instances.

FIG. 3B shows in table 319 an example of the qualified subset SUB2 comprising attributes 320A to 320F.

For each one or more candidate attributes of the qualified subset SUB2, all instances of a candidate block type that can comprise the read records may be determined in step 305. The candidate block type is defined by a combination of the subset of attributes SUB1 and the one or more candidate attributes. If for example, SUB1 comprises Name attribute and the candidate attribute is Address, all instances of the block type defined by combination of attributes Name-Address may be determined. If for example, SUB1 comprises Name attribute and the one or more candidate attributes are Address and Email, all instances of the block type defined by combination of attributes Name-Address-Email may be determined.

For simplification of the description, FIG. 3B illustrates a combination of SUB1 with a single candidate attribute and that for each candidate attribute 320A-F of the qualified subset SUB2, the same number N of instances can be determined from the instances 322.1-N by combining each instance 322.1-N with a distinct value of the candidate attribute 320A-F. For example, if for candidate attribute City, only instances Smith-Frankfurt and Mike-Berlin can be determined, only those two (N=2) instances are determined because all the read records comprise those two distinct groups of values of the combination of attributes SUB1+City.

For each candidate attribute of the qualified subset SUB2, the duplicate rate of records in each of the determined instances of the candidate attribute may be determined in step 307. The duplicate rate indicates the number of records in each determined instance. This is for example shown in FIG. 3B, where the first instance, which is a combination of instance 322.1 and a distinct value of BirthYear candidate attribute 320A, has a duplicate rate of 50.

Using the duplicate rates, the candidate attribute associated with the lowest rate of the duplicate rates may be selected in step 309. For example, as shown in FIG. 3B step 309 may be performed by first determining an overall duplicate rate 325 for each of the candidate attributes 320A-F and by second sorting by ascending order the overall duplicate rates 325 as indicated in table 327 of FIG. 3B. And the top entry of the table 327 may be selected. The candidate attribute of that entry may be the selected candidate attribute. Thus, the combination of attributes may be determined as the combination of the subset of attributes SUB1 and the selected attribute e.g. 320B.

However, in some rare circumstances, the system may not be able to identify a viable option for dynamic data blocking, especially when all computed maximum highest duplication rates 325 become larger than an acceptable rate (e.g. 500). Thus, it may be determined in inquiry step 311, if the duplicate rates of the table 319 are all larger than the acceptable rate. If so, steps 303-311 may be repeated (until the result of inquiry step 311 is "No") to expand the field choices and include additional varieties on field generation by choosing another qualified subset of attributes. If all possible subsets of qualified attributes are tried and one or more iterations are still needed (until the result of inquiry step 311 is "No"), a user may be requested to provide a qualified subset of attributes for each of the one or more iterations or to stop the process and add the data block that has reached the trigger threshold to the block stop list. In each iteration of steps 303-311 a different subset of qualified attributes may be selected from the set of attributes. However, if duplicate rates of the table 319 are not all smaller than the acceptable rate (i.e. the inquiry step 311 is "No"), an exit criterion may be checked in inquiry step 313. The exit criterion may require that the number of attributes of the combination of attributes is larger than a predefined number e.g. the exit criterion may require to have more than 5 attributes in a block type. If (inquiry step 313) the exit criterion is fulfilled the data block that has reached the trigger threshold may be added in step 315 to a block stop list; otherwise the combination of attributes may be provided in step 317 e.g. in order to be used for step 205 of FIG. 2, or provided to a user in order to be analyzed or processed by the user. For example, the user may approve the determined combination of attributes or may provide another qualified subset of attributes that may have not been tried systematically yet—likely by a combination of attributes, in or out of the initial set of attributes in the metadata system, and the method steps 305-3097 with the other qualified subset of attributes.

Figure 4:
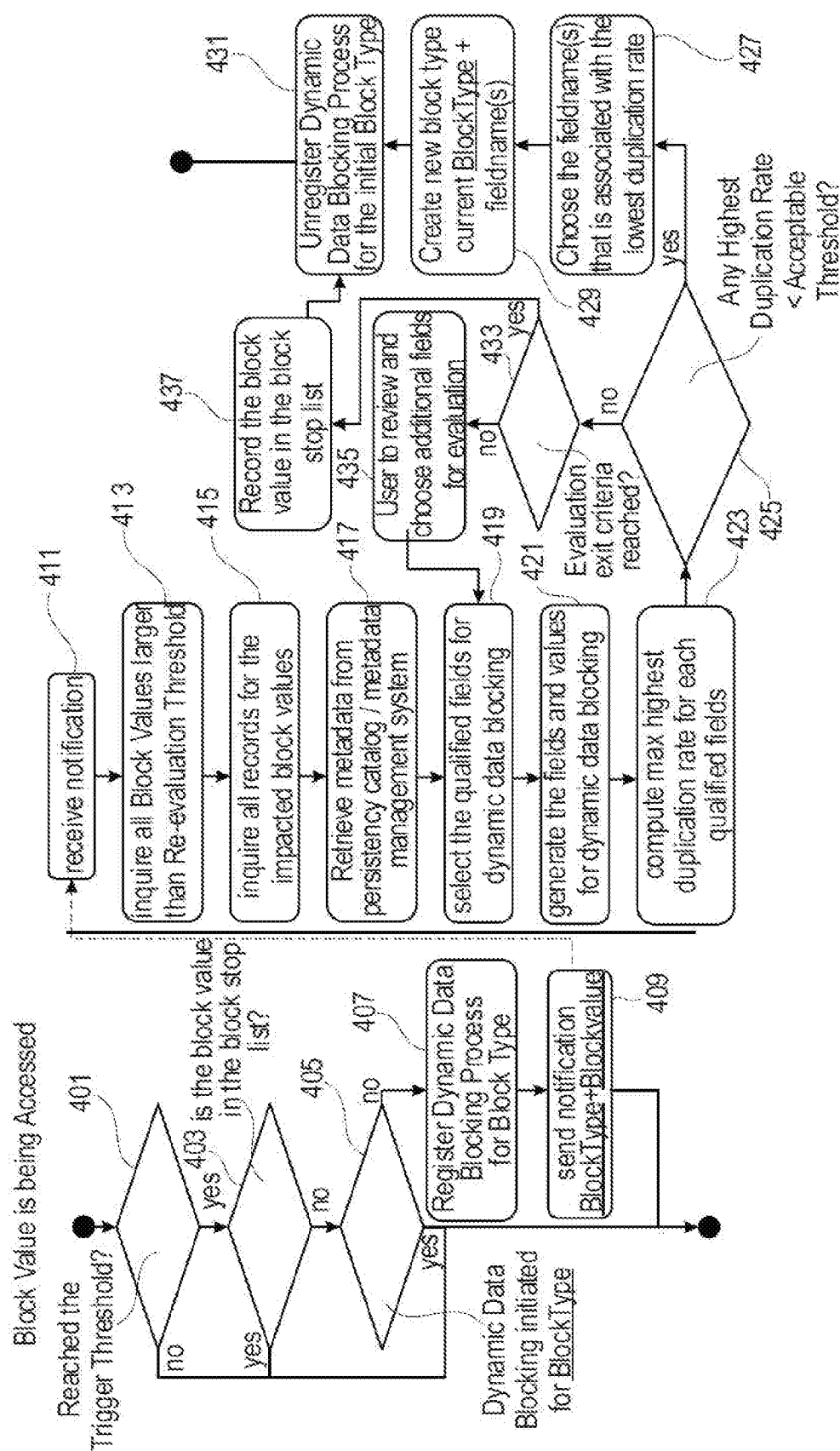
FIG. 4 is a flowchart of a method for managing data blocks of a database system in accordance with an example of the present subject matter.

FIG. 4 is a flowchart of a method for managing data blocks of a database system such as data blocks 131 of system 100. The method of FIG. 4 describes an example of a particular block value (or instance) that is being accessed.

It may be determined (401) if a trigger threshold is reached by the particular block value e.g. if the number of records of the particular block value reached the trigger threshold. If the trigger threshold is not reached by the particular block value the method may end for the particular block value e.g. the block value may not need re-blocking since it has low number of records.

If the trigger threshold is reached by the particular block value, it may be determined (403) if the block value is in the block stop list. If the block value is in the block stop list the method may end for the particular block value.

If the block value is not in the block stop list, it may be determined (405) if the dynamic data blocking is initiated for the block type of the block value. If the dynamic data blocking is initiated for the block type of the block value, the method may end for the particular block value.

If the dynamic data blocking is not initiated for the block type of the block value, the dynamic data blocking process may be registered (407) for the block type. And a notification may be sent (409). The notification may indicate the block type and the block value being processed. The notification may for example be sent to a component that can perform dynamic blocking.

Upon receiving (411) the notification all block values of the block type larger than a re-evaluation threshold may be inquired (413). This results in one or more block values in addition to the block value being processed, thus forming impacted block values. All records for the impacted block values may be inquired (415) and metadata may be retrieved (417) from a persistency catalog metadata management system. The metadata may enable to select (419) qualified fields or attributes for dynamic data blocking. The fields and values may be generated (421) e.g. using the selected fields, for dynamic data blocking. For each qualified field a maximum highest duplication rate may be computed (423). It may be determined (425) if any highest duplication rate is smaller than and an acceptable threshold. If so, steps 427 to 431 may be performed, otherwise steps 433 to 437 may be performed.

The fieldname(s) that is associated with the lowest duplication rate may be selected (427). A new block type may be created (429) using current block type and the fieldname(s) and the dynamic data blocking process may be unregistered (431) for the initial block type.

In inquiry step 433, it may be determined if the exit criterion is reached. If the exit criterion is reached the block value may be recorded (437) in the bloc stop list; otherwise, a user may review and choose (435) additional fields for evaluation and steps 419-437 may be repeated using the additional fields.

Figure 5:
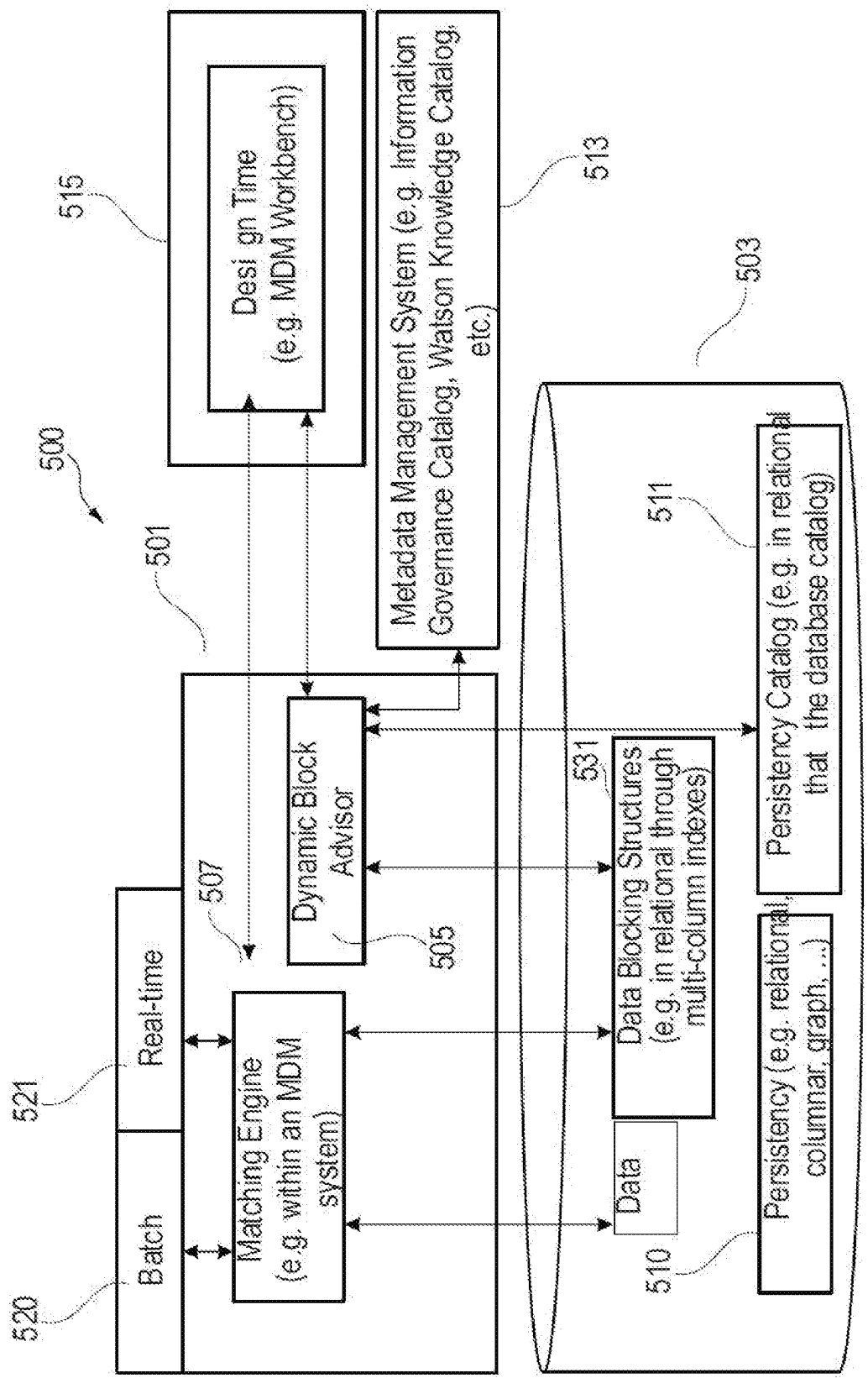
FIG. 5 depicts a block diagram representation of an exemplary computer system in accordance with the present subject matter.

FIG. 5 depicts an exemplary computer system 500. The computer system 500 may, for example, be configured to perform master data management. The computer system 500 comprises an MDM system 501. The MDM system 501 may for example comprise a matching engine 507 for matching records. The MDM system 501 further comprises a dynamic block advisor 505 that is configured for performing at least part of the present method.

For example, the dynamic block advisor 505 may provide the following functions: computation of a recommendation for data blocking as part of an initial system configuration, monitoring of the data blocking structures if a data block exceeds a configurable, critical threshold (e.g. 80% of maximum target size). If the critical threshold is reached/exceeded, it derives a new data blocking strategy (e.g. as defined in FIG. 2). Based on a configuration parameter, it either auto-applies the new data blocking strategy or notifies the administrator/subject matter expert for approval. The dynamic block advisor 505 can optionally allow for manual triggering the re-blocking process.

The MDM system 501 may have access to data stored in a database or repository 503. The repository 503 comprises data blocking structures 531 such as data blocks 131. These may be new data blocking structures which get maintained by the dynamic block advisor 505 automatically. The data blocking structures may receive updates due to create, update or delete operations requested through the batch 520 and/or real-time 521 interfaces. On creates and deletes, the update of these structures happens all the time. In case of update requests, these structures may only be updated if critical data elements are changed which are the attributes on which matching is performed. The repository 503 further comprises persistence data 510 such as graphs and persistency catalog 511. The persistency catalog 511 holds the metadata of the information assets maintained in that persistency. For example, the persistency catalog 511 may be a database catalog of a relational database such as DB2. The persistency catalog 511 may for example contain a list of all tables, all attributes in all the tables, their data types, constraints (e.g. not null, default value, etc.), index structures, etc. and statistics. The statistics include critical information such as cardinality (number of unique values), total number of rows in the table, etc.

The computer system 500 further comprises a metadata management system 513 which may comprise for example a Watson knowledge catalog. The metadata management system 513 may be used by a user to maintain technical and operational metadata for information assets maintained by a system of the user. For a data source, the metadata management system 513 may contain metadata such as terms describing what an attribute in a logical data model is used for from a functional perspective. The metadata may further indicate physical data models corresponding to the functional data models containing information about things like tables, their attributes, their data types, etc. and statistics on the data itself. The metadata management system 513 may, for example, comprise the record metadata and instance metadata.

The computer system 500 further comprises an MDM workbench 515. The content of the repository e.g. 531 and 511 and the metadata management system 513 and MDM workbench 515 may be used by the dynamic block advisor 505 to perform at least part of the present method.

For example, the dynamic block advisor 505 may optionally use either the persistency catalog and/or the metadata management system to pull metadata about attributes to better determine which attributes could be good candidates for updating the data blocking structures.

Figure 6:
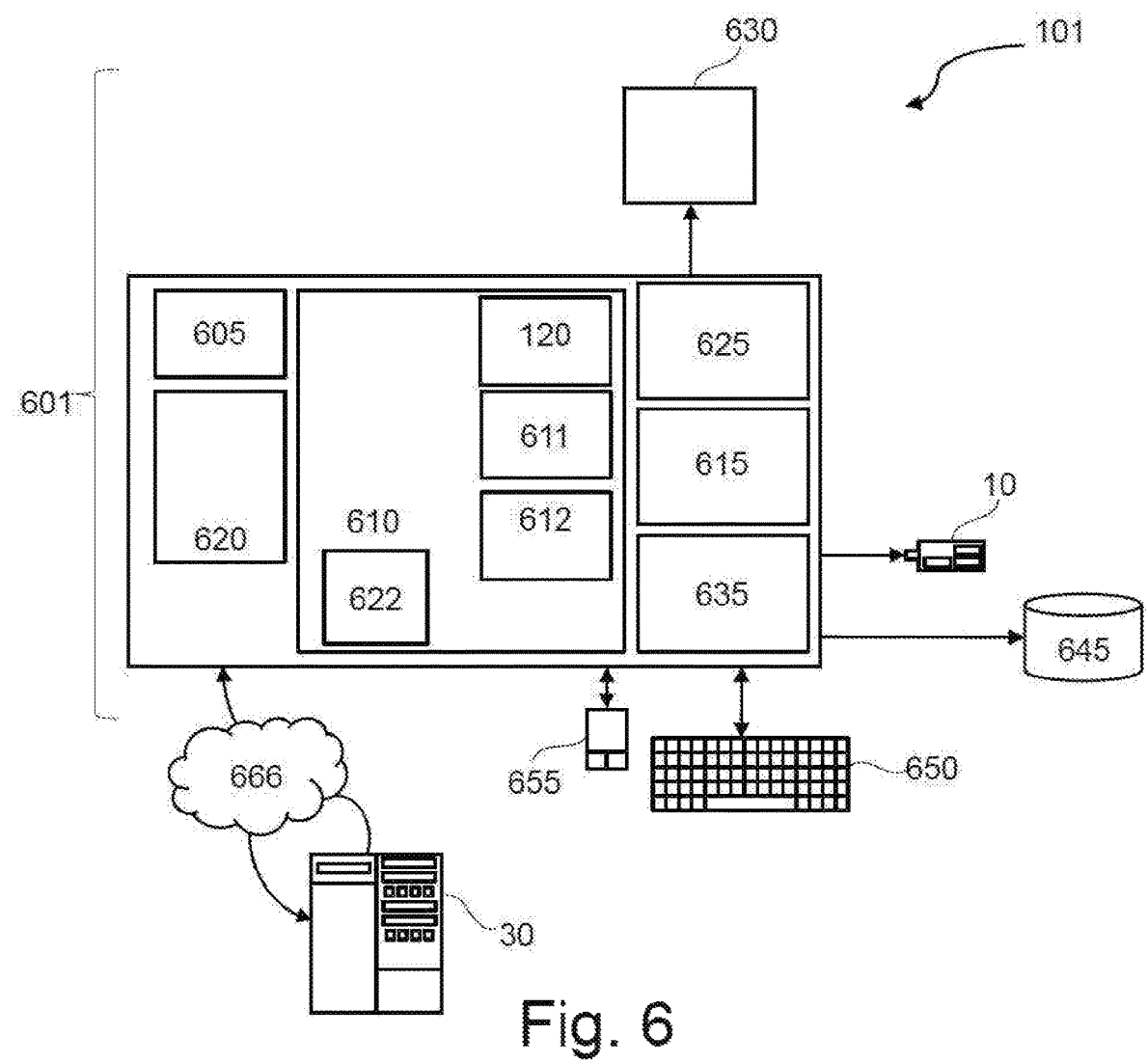
FIG. 6 represents a computerized system, suited for implementing one or more method steps as involved in the present disclosure.

FIG. 6 depicts an example hardware implementation of data integration system 101. FIG. 6 represents a general computerized system, suited for implementing method steps as involved in the present disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 101 therefore includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing software instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention.

The software in memory 610 shall also typically include a suitable operating system (OS) 611. The OS 611 essentially controls the execution of other computer programs, such as the algorithm 120. The algorithm 120 may, for example, comprise a database management system or a Java application. The algorithm 120 may comprise components for performing at least part of the present method. The algorithm 120 may further comprise a component for performing standardization of data records e.g. before performing the matching. The standardization refers to a process of transforming data to a predefined data format. The data format may include a common data definition, format, representation and structure. The data that is to be transformed is the data that is not conform to the predefined data format. For example, the process of transforming the data may comprise processing the data to automatically transform the data where necessary to comply with those common representations that define the data format. This process of transforming data may include identifying and correcting invalid values, standardizing spelling formats and abbreviations, and validating the format and content of the data.

The methods described herein may be in the form of a source program, executable program (object code), script, or any other entity comprising a set of instructions to be performed. When a source program, then the program needs to be translated via a compiler, assembler, interpreter, or the like, which may or may not be included within the memory 610, so as to operate properly in connection with the OS 611. Furthermore, the methods can be written as an object oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 101 can further include a display controller 625 coupled to a display 630. In exemplary embodiments, the system 101 can further include a network interface for coupling to a network 666. The network 666 can be an IP-based network for communication between the computer 601 and any external server, client and the like via a broadband connection. The network 666 transmits and receives data between the computer 601 and external systems 30, which can be involved to perform part or all of the steps of the methods discussed herein. In exemplary embodiments, network 666 can be a managed IP network administered by a service provider. The network 666 may be implemented in a wireless fashion, e.g., using wireless protocols and technologies, such as WiFi, WiMax, etc. The network 666 can also be a packet-switched network such as a local area network, wide area network, metropolitan area network, Internet network, or other similar type of network environment. The network 666 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software stored within the memory 610, to communicate data to and from the memory 610, and to generally control operations of the computer 601 pursuant to the software. The methods described herein and the OS

611, in whole or in part, but typically the latter, are read by the processor 605, possibly buffered within the processor 605, and then executed.

When the systems and methods described herein are implemented in software, as is shown in FIG. 6, the methods can be stored on any computer readable medium, such as storage 620, for use by or in connection with any computer related system or method. The storage 620 may comprise a disk storage such as HDD storage.

Various embodiments are specified in the following numbered clauses:

1. A method for a database system, the database system comprising a set of data blocks comprising records having a set of attributes, wherein the set of data blocks are instances of at least one block type, wherein the block type is defined by a subset of one or more attributes of the set of attributes such that an instance of the block type comprises records having one distinct group of values of the subset of attributes; the method comprising:

detecting that a subset of one or more data blocks of the block type, of the set of data blocks, reached a first maximum number of records;

determining an additional attribute of the set of attributes in order to define a new block type by the combination of the additional attribute and the subset of attributes that define the block type;

creating one or more data blocks which are instances of the new block type; and storing a received new record having values of the subset of attributes and the additional attribute in the corresponding instance of the new block type.

2. The method of clause 1, further comprising storing the records of the subset of data blocks in the corresponding instances of the new block type and removing the subset of data blocks.

3. The method of clause 1, the at least one block type comprising multiple block types, each block type of the block types being defined by a respective subset of one or more attributes of the set of attributes, the method further comprising repeating the method for each distinct block type of the multiple block types.

4. The method of clause 3, the repeating of the method being performed in parallel for the distinct block types.

5. The method of clause 1, the detecting comprising detecting a data block of the set of data blocks that reached a second maximum number of records, and searching for data blocks that reached the first maximum number of records, resulting in the subset of one or more data blocks of the block type.

6. The method of clause 5, the second maximum number being higher than the first maximum number.

7. The method of clause 5, the method is performed if the data block that reached the second maximum number of records is not part of a block stop list.

8. The method of clause 1, determining the additional attribute comprising:

reading all records of the subset of the data blocks;

determining a qualified subset of attributes of the set of attributes that are different from the subset of attributes;

for each candidate attribute of the qualified subset determining all instances of a candidate block type that can comprise the read records, the candidate block type being defined by a combination of the subset of attributes and the candidate attribute;

determining the duplicate rate of records in the determined instances;

selecting the candidate attribute associated with the lowest rate of the duplicate rates; and providing the additional attribute as the selected attribute.

9. The method of clause 8, wherein the providing is performed if the lowest rate is smaller than a predefined threshold, the method further comprising in response to determining that the lowest rate is higher than the predefined threshold, repeating the determining step and selecting step using instead of the candidate attribute a combination of the candidate attribute and one more further candidate attributes in each iteration, wherein the additional attribute is the selected combination of two or more candidate attributes.

10. The method of clause 8, the qualified subset of attributes being a user defined subset.

11. The method of clause 9, wherein the repeating is performed while the number of attributes in the combination of candidate attributes is smaller than a predefined maximum number, wherein the providing is performed in case said number of attributes is smaller than the maximum number, wherein in case said number of attributes becomes larger than the maximum number, adding the data block that reached the second maximum number of records to the stop list.

12. The method of clause 1, wherein the additional attribute is a primitive type with a predefined maximum length, excludes a Binary Large OBject (BLOB), and has a duplication rate that is smaller than a predefined maximum rate.

13. The method of clause 1, the detecting further comprising initiating a dynamic data blocking process by registering the dynamic data blocking process for the block type, wherein the determining and creating steps are steps of the dynamic data blocking process, wherein the method further comprises after the creating step unregistering the dynamic data blocking process for the block type.

14. The method of clause 1, the storing of the received new record and further received new records having values of the subset of attributes and the additional attribute in the corresponding instances of the new block type resulting in a group of blocks that are associated with the subset of attributes, the group of blocks comprising the blocks of the block type as first level blocks and the blocks of the new block type as a second level of blocks, the method further comprising:

receiving a record having non-empty values of the subset of attributes;

determining from the group of blocks all applicable full blocks that have the first maximum number of records and an additional applicable block that has less than the first maximum number of records and that has a level that is equal or subsequent to the highest level of the determined full blocks; and comparing the received record with each record of the determined blocks.

15. The method of clause 1, further comprising repeating the method for the new block type.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for a database system, the database system comprising a set of data blocks comprising records having a set of attributes, wherein the set of data blocks are instances of at least one block type, and the block type is defined by a subset of one or more attributes of the set of attributes such that an instance of the block type comprises records having one distinct group of values of the subset of attributes, the method comprising:

detecting that a subset of one or more data blocks of the block type, of the set of data blocks, reached a first maximum number of records;

determining an additional attribute of the set of attributes in order to define a new block type by the combination of the additional attribute and the subset of attributes that define the block type;

creating one or more data blocks which are instances of the new block type; and storing a received new record having values of the subset of attributes and the additional attribute in the corresponding instance of the new block type, wherein determining the additional attribute includes:
reading all records of the subset of the data blocks;
determining a qualified subset of attributes of the set of attributes that are different from the subset of attributes;
for each candidate attribute of the qualified subset, determining all instances of a candidate block type that can comprise the read records, the candidate block type being defined by a combination of the subset of attributes and the candidate attribute;
determining a duplicate rate of records in the determined instances;
selecting the candidate attribute associated with the lowest rate of the duplicate rates; and
providing the additional attribute as the selected attribute.

2. The method of claim 1, further comprising:
storing the records of the subset of data blocks in the corresponding instances of the new block type, and
removing the subset of data blocks.

3. The method of claim 1, wherein:
the at least one block type comprises multiple block types, each block type of the multiple block types is defined by a respective subset of one or more attributes of the set of attributes, and
the method further comprises repeating the method for each distinct block type of the multiple block types.

4. The method of claim 3, wherein repeating the method for each distinct block type is performed in parallel for the distinct block types.

5. The method of claim 1, further comprising:
detecting a data block of the set of data blocks that reached a second maximum number of records, and
searching for data blocks that reached the first maximum number of records, resulting in the subset of one or more data blocks of the block type.

6. The method of claim 5, wherein the second maximum number of records is higher than the first maximum number of records.

7. The method of claim 5, wherein the method is performed if the data block that reached the second maximum number of records is not part of a block stop list.

8. The method of claim 1, wherein:
providing the additional attribute as the selected attribute is performed if the lowest rate is smaller than a predefined threshold,
the method further comprises, in response to determining that the lowest rate is higher than the predefined threshold, repeating determining and selecting using instead of the candidate attribute a combination of the candidate attribute and one more further candidate attributes in each iteration, and
the additional attribute is the selected combination of two or more candidate attributes.

9. The method of claim 1, wherein the qualified subset of attributes is a user defined subset.

10. The method of claim 8, wherein:
repeating is performed while the number of attributes in the combination of candidate attributes is smaller than a predefined maximum number,
providing is performed in case said number of attributes is smaller than the maximum number,
in case said number of attributes becomes larger than the maximum number, the data block that reached the second maximum number of records is added to the stop list.

11. The method of claim 1, wherein the additional attribute is a primitive type with a predefined maximum length, excludes a Binary Large OBject (BLOB), and has a duplication rate that is smaller than a predefined maximum rate.

12. The method of claim 1, wherein:
detecting further comprises initiating a dynamic data blocking process by registering the dynamic data blocking process for the block type,
determining and creating are operations of the dynamic data blocking process, and
the method further comprises, after creating, unregistering the dynamic data blocking process for the block type.

13. The method of claim 1, wherein:
storing the received new record and further received new records having values of the subset of attributes and the additional attribute in the corresponding instances of the new block type results in a group of blocks that are associated with the subset of attributes, the group of blocks comprising the blocks of the block type as first level blocks and the blocks of the new block type as a second level of blocks, and
the method further comprises:
receiving a record having non-empty values of the subset of attributes;
determining from the group of blocks all applicable full blocks that have the first maximum number of records and an additional applicable block that has less than the first maximum number of records and that has a level that is equal or subsequent to the highest level of the determined full blocks; and
comparing the received record with each record of the determined blocks.

14. The method of claim 1, further comprising repeating the method for the new block type.

15. A computer system comprising:
a set of data blocks comprising records having a set of attributes, wherein the set of data blocks are instances of at least one block type, wherein the block type is defined by a subset of one or more attributes of the set of attributes such that an instance of the block type comprises records having one distinct group of values of the subset of attributes; and
a processor configured to:
detect that a subset of one or more data blocks of the block type, of the set of data blocks, reached a first maximum number of records;
determine an additional attribute of the set of attributes in order to define a new block type by the combination of the additional attribute and the subset of attributes that define the block type;
create one or more data blocks which are instances of the new block type; and store a received new record having values of the subset of attributes and the additional attribute in the corresponding instance of the new block type, wherein to determine the additional attribute, the processor is further configured to:
  read all records of the subset of the data blocks;
  determine a qualified subset of attributes of the set of attributes that are different from the subset of attributes;
  for each candidate attribute of the qualified subset, determine all instances of a candidate block type that can comprise the read records, the candidate block type being defined by a combination of the subset of attributes and the candidate attribute;
  determine a duplicate rate of records in the determined instances;
  select the candidate attribute associated with the lowest rate of the duplicate rates; and
  provide the additional attribute as the selected attribute.

16. The computer system of claim 15, wherein the processor is further configured to:
  store the records of the subset of data blocks in the corresponding instances of the new block type, and
  remove the subset of data blocks.

17. The computer system of claim 15, wherein:
  the at least one block type comprises multiple block types, and
  each block type of the multiple block types is defined by a respective subset of one or more attributes of the set of attributes.

18. The computer system of claim 15, wherein the processor is further configured to:
  detect a data block of the set of data blocks that reached a second maximum number of records, and
  search for data blocks that reached the first maximum number of records, resulting in the subset of one or more data blocks of the block type.

19. The computer system of claim 18, wherein the second maximum number of records is higher than the first maximum number of records.

20. A method for a database system, the database system comprising a set of data blocks comprising records having a set of attributes, wherein the set of data blocks are instances of at least one block type, and the block type is defined by a subset of one or more attributes of the set of attributes such that an instance of the block type comprises records having one distinct group of values of the subset of attributes, the method comprising:
  detecting that a subset of one or more data blocks of the block type, of the set of data blocks, reached a first maximum number of records;
  determining an additional attribute of the set of attributes in order to define a new block type by the combination of the additional attribute and the subset of attributes that define the block type;
  creating one or more data blocks which are instances of the new block type;
  storing a received new record having values of the subset of attributes and the additional attribute in the corresponding instance of the new block type, wherein storing the received new record and further received new records having values of the subset of attributes and the additional attribute in the corresponding instances of the new block type results in a group of blocks that are associated with the subset of attributes, the group of blocks comprising the blocks of the block type as first level blocks and the blocks of the new block type as a second level of blocks;
  receiving a record having non-empty values of the subset of attributes;
  determining from the group of blocks all applicable full blocks that have the first maximum number of records and an additional applicable block that has less than the first maximum number of records and that has a level that is equal or subsequent to the highest level of the determined full blocks; and
  comparing the received record with each record of the determined blocks.

* * * * *